United States Patent
Suresh et al.

(10) Patent No.: US 10,013,213 B2
(45) Date of Patent: Jul. 3, 2018

(54) CONTAINER MIGRATION UTILIZING STATE STORAGE OF PARTITIONED STORAGE VOLUME

(71) Applicant: EMC Corporation, Hopkinton, MA (US)

(72) Inventors: Keerthana Suresh, Sunnyvale, CA (US); Vaibhav Khanduja, Cupertino, CA (US); Ashish Mehrotra, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 116 days.

(21) Appl. No.: 15/136,190

(22) Filed: Apr. 22, 2016

(65) Prior Publication Data

US 2017/0308330 A1 Oct. 26, 2017

(51) Int. Cl.
*G06F 3/06* (2006.01)

(52) U.S. Cl.
CPC .......... *G06F 3/0665* (2013.01); *G06F 3/0619* (2013.01); *G06F 3/0644* (2013.01); *G06F 3/0689* (2013.01)

(58) Field of Classification Search
CPC .... G06F 3/0689; G06F 3/0644; G06F 3/0619; G06F 3/0665
See application file for complete search history.

(56) References Cited

U.S. PATENT DOCUMENTS 8,417,747 B1 4/2013 Hayden et al.
8,898,402 B1 11/2014 Stronge (Continued)

FOREIGN PATENT DOCUMENTS

| CN | 103810046 A | 5/2014 |
|---|---|---|
| CN | 103870314 A | 6/2014 |
| CN | 104104513 A | 10/2014 |

OTHER PUBLICATIONS

A. Gulati et al., "mClock: Handling Throughput Variability for Hypervisor IO Scheduling," USENIX Symposium on Operating Systems Design and Implementation (OSDI), https://labs.vmware.com/academic/publications/mclock, Oct. 2010, 14 pages.

Sysdig.Org, "Universal System Visibility with Native Container Support," 2015, 3 pages Encomium to Technology, "Dissecting Docker Security—Part 1," http://goo.gl/35Jr9D, Aug. 12, 2015, 3 pages.

(Continued)

*Primary Examiner* — Larry T Mackall
(74) *Attorney, Agent, or Firm* — Ryan, Mason & Lewis, LLP (57) ABSTRACT

An apparatus comprises at least a first container host device implementing a plurality of containers, a storage platform coupled to the first container host device and implementing storage resources for utilization by the containers, and a container storage controller associated with the first container host device. The container storage controller is configured to provision portions of the storage resources for respective ones of the containers including for each of the containers at least one storage volume. The provisioned storage volume for a given one of the containers is partitioned into at least a data storage volume and a state storage volume, with the data storage volume being configured to store data for at least one application running in the given container, and the state storage volume being configured to store state information of the given container for use in migrating the given container from the first container host device to a second container host device.

20 Claims, 4 Drawing Sheets

(56) References Cited

U.S. PATENT DOCUMENTS

| | | | |
|---|---|---|---|
| 9,256,467 B1* | 2/2016 | Singh | G06F 9/5055 |
| 2006/0248587 A1* | 11/2006 | Ray | G06F 21/57 |
| | | | 726/22 |
| 2008/0256607 A1 | 10/2008 | Janedittakarn et al. | |
| 2012/0173488 A1 | 7/2012 | Spielberg et al. | |
| 2012/0174113 A1 | 7/2012 | Pohlmann | |
| 2012/0180039 A1 | 7/2012 | Bravery et al. | |
| 2013/0145006 A1 | 6/2013 | Tammam | |
| 2014/0274408 A1 | 9/2014 | Dave | |
| 2014/0317618 A1 | 10/2014 | Behera et al. | |
| 2014/0366155 A1 | 12/2014 | Chang et al. | |
| 2015/0058861 A1 | 2/2015 | Zheng et al. | |
| 2015/0074058 A1 | 3/2015 | Zhao et al. | |
| 2015/0120928 A1 | 4/2015 | Gummaraju et al. | |
| 2015/0381589 A1* | 12/2015 | Tarasuk-Levin | H04L 63/0428 |
| | | | 713/193 |

OTHER PUBLICATIONS

Encomium to Technology, "Aesthetics of Linux Security Modules," http://goo.gi/x12gJD, Aug. 12, 2015, 3 pages.

Netlink, "Linux Programmer's Manual," http://man7.org/linux/man-pages/man7/netlink.7.html, Jan. 10, 2015, 7 pages.

U.S. Appl. No. 14/752,153 filed in the name of R. Wallner et al. on Jun. 26, 2015 and entitled "Coordinated Resource Allocation Between Container Groups and Storage Groups."

U.S. Appl. No. 14/820,026 filed in the name of Vaibhav Khanduja et al. on Aug. 6, 2015 and entitled "Provisioning Isolated Storage Resource Portions for Respective Containers in Multi-Tenant Environments."

U.S. Appl. No. 14/939,562 filed in the name of Vaibhav Khanduja on Nov. 12, 2015 and entitled "Intrusion Detection for Storage Resources Provisioned to Containers in Multi-Tenant Environments."

Docker.com, "Docker—Build, Ship, Run," http://www.docker.com, Apr. 14, 2016, 8 pages.

* cited by examiner

CONTAINER MIGRATION UTILIZING STATE STORAGE OF PARTITIONED STORAGE VOLUME

FIELD

The field relates generally to information processing systems, and more particularly to virtual resources in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system. However, significant challenges can arise in the deployment of containers. For example, it can be difficult to migrate containers from one container host device to another.

SUMMARY

Illustrative embodiments provide techniques for efficient and flexible migration of containers between container host devices. Such techniques in some embodiments involve storing container environment state information with application state information in a state storage volume of a partitioned storage volume provisioned for a given container. The partitioned storage volume of the given container illustratively comprises at least a data storage volume and the state storage volume.

In one embodiment, an apparatus comprises at least a first container host device implementing a plurality of containers, a storage platform coupled to the first container host device and implementing storage resources for utilization by the containers, and a container storage controller associated with the first container host device. The container storage controller is configured to provision portions of the storage resources for respective ones of the containers including for each of the containers at least one storage volume. The storage volume for a given one of the containers is partitioned into at least a data storage volume and a state storage volume, with the data storage volume being configured to store data for at least one application running in the given container, and the state storage volume being configured to store state information of the given container for use in migrating the given container from the first container host device to a second container host device.

In some embodiments, the state information comprises application state information for an application running in the given container and corresponding container environment state information for that application. The container environment state information may more particularly comprise information characterizing one or more parameters of a container operating environment of the application, such as network parameters, port parameters, storage parameters and command line parameters.

Additionally or alternatively, the container environment state information for the application running in the given container may comprise identifiers of one or more other containers that the application links to in the course of its execution.

The container storage controller may illustratively comprise a container storage orchestration tool running as an application on the container host device.

As noted above, illustrative embodiments described herein provide significant improvements relative to conventional arrangements. For example, in some of these embodiments, difficulties associated with migration of containers from one container host device to another container host device are avoided. Such arrangements advantageously allow for significantly more efficient use of available resources within a given data center or other type of information processing system.

These and other illustrative embodiments described herein include, without limitation, methods, apparatus, systems, and processor-readable storage media.

BRIEF DESCRIPTION OF THE DRAWINGS

FIGS. 4 and 5 are flow diagrams of respective processes for container creation and migration in illustrative embodiments.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as multi-tenant environments.

Figure 1:
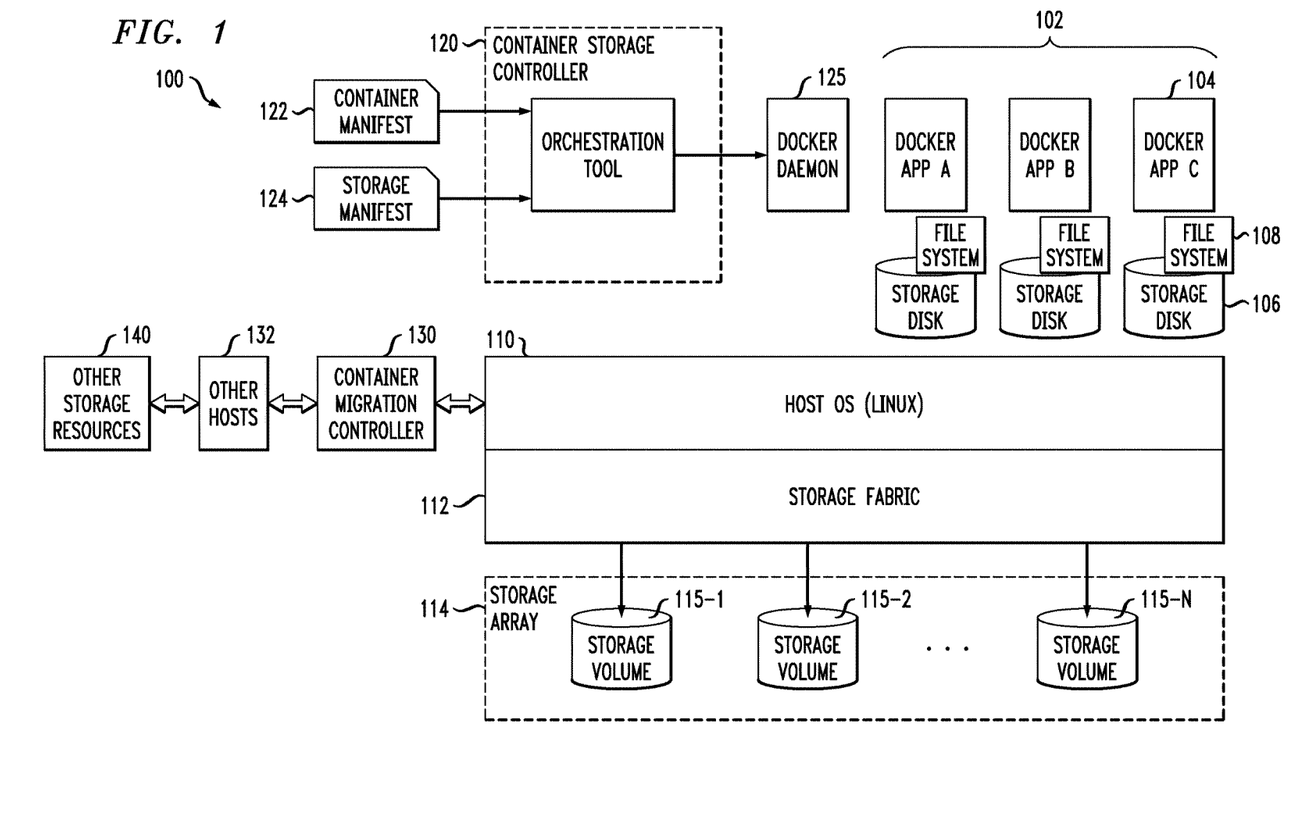
FIG. 1 shows an information processing system configured to support migration of containers between container host devices in an illustrative embodiment.

FIG. 1 shows an information processing system 100 configured in accordance with an illustrative embodiment. The system 100 comprises a plurality of containers 102 that are assumed to be implemented by at least one container host device. Each of the containers 102 comprises a corresponding application 104 that runs in that container, a storage disk 106, and an associated file system (FS) 108. The storage disks 106 are examples of what are more generally referred to herein as "storage volumes." The storage disks in some embodiments may comprise respective virtual disks. A wide variety of other types of physical or virtual storage volumes may be used in other embodiments.

The containers 102 are assumed to be associated with respective tenants of a multi-tenant environment of the system 100, although in other embodiments a given tenant can have multiple containers. However, it is to be appreciated that other embodiments can be implemented outside of the multi-tenant environment context. Accordingly, embodiments disclosed herein are not limited to multi-tenant environments.

It will also be assumed for further description below that a single container host device implements all of the containers 102 of the FIG. 1 embodiment, although other embodiments can include multiple container host devices. Each of these container host devices illustratively comprises at least one processor coupled to a memory. Such host devices are examples of what are more generally referred to herein as "processing devices."

The containers 102 of the system 100 are illustratively implemented as respective Docker containers, but one or more of the containers in other embodiments can comprise other types of containers, such as other types of Linux containers (LXCs). It is therefore to be appreciated that embodiments of the present invention are not restricted to use with Docker containers or any other particular type of containers. The containers 102 are assumed to be implemented on the above-noted container host device using Linux kernel control groups ("cgroups").

The containers 102 may be utilized to implement a variety of different types of functionality within the system 100. For example, such containers can be used to implement platform-as-a-service (PaaS) or infrastructure-as-a-service (IaaS) functionality in system 100, as well as microservices or converged infrastructure within a data center or other cloud computing and storage system. More particularly, in the present embodiment, the containers 102 comprise respective Docker containers running respective Docker applications denoted A, B and C, with each such container and its associated application corresponding to a different tenant of the multi-tenant environment of system 100.

The tenants associated with the respective containers 102 in the FIG. 1 embodiment are also referred to herein as tenants A, B and C. Accordingly, Docker application A is run in a container of tenant A, Docker application B is run in a container of tenant B, and Docker application C is run in a container of tenant C.

In other embodiments, processes other than applications 104 can be run in the containers 102. By way of example, containers can be used to implement respective portions of one or more cloud compute nodes of a cloud computing system. Such compute nodes may be associated with respective cloud tenants.

The container host device that implements the containers 102 in the FIG. 1 embodiment has a host operating system (OS) 110 that illustratively comprises a Linux operating system. The container host device is coupled to a storage platform that implements storage resources for utilization by the containers 102. The storage platform in this embodiment comprises a storage fabric 112 coupled to a storage array 114. The storage array 114 comprises a plurality of storage volumes denoted 115-1, 115-2, . . . 115-N. Other embodiments can implement other types of storage platforms, such as storage platforms comprising only a storage array, or storage platforms that use a storage fabric without a storage array. As noted above, storage resources of the storage platform comprising storage fabric 112 and storage array 114 are utilized by the containers 102 of the respective tenants A, B and C.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise, for example, storage products such as VNX® and Symmetrix VMAX® storage arrays, software-defined storage products such as ScaleIO™ and ViPR®, flash-based storage arrays such as DSSD™ and XtremIO™, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

As another example, at least portions of a given storage platform in some embodiments can comprise converged infrastructure such as VxRail™, VxRack™ or Vblock® converged infrastructure commercially available from VCE, the Virtual Computing Environment Company, an EMC Federation Company.

The system 100 further comprises a container storage controller 120. In the present embodiment, at least a portion of the container storage controller 120 is assumed to be running as an application on the same container host device that implements the containers 102 for the respective tenants. By way of example, the container storage controller may run at least in part in its own container on the container host device, separate from the containers 102, although it need not run in a container.

The container storage controller 120 is configured to provision portions of the storage resources of the storage platform for respective ones of the containers 102. The provisioned portions of the storage resources of the storage platform include for each of the containers 102 at least one storage volume. The storage disks 106 are illustrative examples of storage volumes provisioned for respective ones of the containers 102, although other types of storage volumes, including physical or virtual storage volumes, or combinations thereof, can be provisioned for one or more of the containers 102 in other embodiments.

The container storage controller 120 is illustrated in the figure as comprising a container storage orchestration tool. An example of a container storage orchestration tool is the Embers tool described in U.S. patent application Ser. No. 14/820,026, filed Aug. 6, 2015 and entitled "Provisioning Isolated Storage Resource Portions for Respective Containers in Multi-Tenant Environments," which is commonly assigned herewith and incorporated by reference herein. Accordingly, provisioning of storage resources of the storage platform comprising storage fabric 112 and storage array 114 in the FIG. 1 embodiment can be implemented utilizing the above-noted Embers tool or another type of container storage orchestration tool. It is to be appreciated, however, that embodiments of the present invention can utilize any of a wide variety of other types of container storage controllers, such as otherwise conventional controllers for Docker containers or other LXCs, suitably modified to incorporate functionality as disclosed herein, and are therefore not limited to container storage orchestration tools.

The container storage controller 120 in the present embodiment provisions storage resources to the containers 102 in accordance with associated container manifests 122 and storage manifests 124.

The container storage controller 120 is also assumed to be configured to control starting and stopping of the containers 102, and to provide other functionality within the system 100 such as snapshotting of the storage disks 106 of respective ones of the containers 102.

As a more particular example, the container storage controller 120 is illustratively configured to stop a given one of the containers, adjust its corresponding provisioned portion of the storage resources, and restart the given container with an updated storage disk 106 and associated file system 108 configured to reflect the adjusted provisioned portion of the storage resources.

It is assumed that that each of the storage disks 106 as well as other types of storage volumes have associated therewith a metadata mapping table or other suitable mapping functionality for translating logical addresses of data specified in input/output (I/O) operations directed to the storage volume to corresponding physical addresses in the underlying storage platform comprising storage fabric 112 and storage array 114. For example, any of a wide variety of address translation techniques can be used to support such mapping functionality. The mapping functionality can be provisioned, for example, in conjunction with provisioning of the corresponding storage disk or other storage volume under the control of the container storage controller 120.

In some embodiments, the container storage controller 120 can adjust the provisioned storage resources, for example, in order to accommodate potentially-conflicting storage demands of different tenants.

The container storage controller 120 in the present embodiment is configured to control the containers 102 via at least one Docker daemon 125. The Docker daemon 125 is a tool provided by Docker to create containers using Linux cgroups and associated namespaces. The container storage controller 120 can communicate with the Docker daemon 125 via at least one application programming interface (API) which may comprise a RESTful API possibly in combination with one or more additional APIs of other types. The container storage controller 120 can also interface to the storage platform via one or more APIs. One or more of the containers 102 can be started, stopped or otherwise controlled using the connecting Docker daemon 125 through its RESTful API, which is illustratively a publically-available API.

As noted above, the container storage controller 120 manages the starting and stopping of the containers 102 as well as the provisioning and connection of their respective storage disks 106 and file systems 108. In conjunction with the starting or restarting of a given one of the containers 102, the container is connected with its corresponding one of the storage disks 106, for example, during an initialization portion of the container starting or restarting process. If the storage needs of the given container have changed since its last run, the container storage controller 120 can extend or shrink the size of the storage disk of the given container. For example, an existing virtual disk of the given container can be extended by daisy chaining a differencing virtual disk to a previously-provisioned virtual disk. In addition, protection functionality such as "cold" or "warm" snapshotting of the storage disk can be provided.

The container storage controller 120 is illustratively implemented as a dedicated application for provisioning storage resource portions to respective ones of the containers 102, illustratively in accordance with respective container manifests 122 and respective storage manifests 124. The container and storage manifests 122 and 124 may be specified at least in part by the applications, tenants or other entities associated with the respective containers. For example, the container manifests 122 may comprise container operating environment specifications for the respective containers and the storage manifests 124 may comprise storage resource requirement specifications for the respective containers. The container manifests 122 and storage manifests 124 are illustratively processed by a container storage orchestration tool of the container storage controller, running as an application on the container host device that also implements the containers 102.

The container storage controller 120 is configured to identify a given container characterized by its corresponding container manifest 122 and provision the storage disk 106 and associated file system 108 for the given container in accordance with the storage manifest 124 prior to starting the given container.

The storage manifest 124 for the given container specifies one or more of storage volume size, storage type, deduplication property, protection mechanism and storage mount path for the storage volume of that container.

The system 100 further comprises a container migration controller 130. The container migration controller 130 interacts with the host operating system 110 of the container host device and also interacts with one or more other container host devices ("hosts") 132. The container migration controller 130 in the present embodiment is assumed to be configured to support a wide variety of different types of migration, including live migration and offline migration. Accordingly, the term "migration" as used herein is intended to be broadly construed so as to encompass these and other types of movement of containers and their associated applications between container host devices.

Although illustrated in FIG. 1 as being implemented separate from the host operating system 110 and container storage controller 120, the container migration controller 130 in some embodiments can be implemented at least in part internally to one or more of the components 110 and 120.

In the FIG. 1 embodiment, it is assumed that the storage volumes provisioned for the respective containers 102 are each partitioned into at least a data storage volume and a state storage volume, with the data storage volume being configured to store data for at least one application running in the given container, and the state storage volume storing state information of the given container for use in migrating the given container from the first container host device to a second container host device. A more particular example of such a partitioning arrangement will be described below in conjunction with FIG. 3.

As mentioned previously, the provisioned storage volumes in the FIG. 1 embodiment comprise respective storage disks 106 having respective associated file systems 108, although other types of storage volumes can be provisioned to the respective containers and partitioned into data storage and state storage volumes.

The state information stored in the state storage volume for a given container illustratively comprises application state information for an application running in the given container and corresponding container environment state information for that application.

The container environment state information for the application running in the given container illustratively comprises information characterizing one or more parameters of a container operating environment of the application such as, for example, network parameters, port parameters, storage parameters and command line parameters. Additionally or alternatively, the container environment state information may comprise identifiers of one or more other containers that the application running in the given container links to in the course of its execution.

The container migration controller 130 in the FIG. 1 embodiment is configured to migrate a given container from one container host device to another container host device. For example, the container migration controller 130 can migrate the container associated with Docker application A in the FIG. 1 embodiment from its corresponding container host device to another container running on one of the other hosts 132. The other host to which the container is migrated is assumed to have access to other storage resources 140 not otherwise associated with the storage fabric 112 and storage array 114.

In conjunction with migration of the given container, the container migration controller 130 in the FIG. 1 embodiment is configured to retrieve the state information of the given container from the state storage volume of its corresponding partitioned storage volume, to stop the given container on a first container host device, to start the given container on a second container host device, and to utilize the retrieved state information to configure the given container on the second container host device.

As mentioned previously, the container migration controller 130 in other embodiments can be implemented at least in part within the container storage controller 120, although it is shown as separate from the container storage controller 120 in the present embodiment.

The container migration controller 130 and related system components provide a number of significant advantages relating to live and offline migration and other types of movement of containers and their associated applications. For example, in the present embodiment, difficulties associated with migration of containers from one container host device to another container host device are avoided. Such arrangements advantageously allow for significantly more efficient use of available virtual infrastructure within a given data center or other type of information processing system.

Although shown as being separate from the storage platform in the FIG. 1 embodiment, one or both of the container storage controller 120 and the Docker daemon 125 can in some embodiments be implemented at least in part within the storage platform, or on at least one processing device that implements at least a portion of the storage platform. Numerous other arrangements of processing devices can be used to implement the containers 102, container storage controller 120, Docker daemon 125, and associated container host device and storage platform elements.

Accordingly, it is to be appreciated that the particular arrangement of system elements shown in FIG. 1 is for purposes of illustration only. Numerous alternative system configurations, involving other arrangements of additional or alternative elements, can therefore be used to implement migration control functionality for facilitating movement of containers between container host devices.

The operation of an illustrative embodiment of an information processing system will now be described in further detail with reference to the flow diagram of FIG. 2. The process as shown includes steps 200 through 208. This process may be implemented in the context of the FIG. 1 embodiment, or in other embodiments that are configured to support migration of containers between container host devices.

In step 200, containers are implemented on at least a first container host device. For example, the containers may be implemented for respective tenants of a multi-tenant environment. The containers are more particularly assumed to be implemented on a single container host device, and illustratively comprise Docker containers or other types of Linux containers. The containers may be implemented at least in part utilizing a Docker daemon or other similar container generating program, possibly implemented within or in association with a container storage controller, such as the container storage controller 120 and its associated orchestration tool in the context of the FIG. 1 embodiment.

In step 202, portions of storage resources of a storage platform are provisioned for respective ones of the containers. The provisioned storage resources include for each of the containers at least one storage volume, such as the storage disks 106 provisioned for respective ones of the containers 102 by the container storage controller 120 in the FIG. 1 embodiment. Such storage resources are assumed to be part of a storage platform comprising at least one storage array as in the FIG. 1 embodiment.

In step 204, the provisioned storage volume for a given one of the containers is partitioned into at least a data storage volume and a state storage volume. An example of such partitioning of a provisioned storage volume will be described below in conjunction with FIG. 3.

In step 206, the data storage volume is utilized to store data for at least one application running in the given container.

In step 208, the state storage volume is utilized to store state information of the given container for use in migrating the given container from the first container host device to a second container host device. The state information illustratively comprises application state information for an application running in the given container and corresponding container environment state information for that application. As mentioned previously, the container environment state information for the application running in the given container illustratively comprises information characterizing one or more parameters of a container operating environment of the application such as, for example, network parameters, port parameters, storage parameters and command line parameters. Additionally or alternatively, the container environment state information may comprise identifiers of one or more other containers that the application running in the given container links to in the course of its execution.

Figure 2:
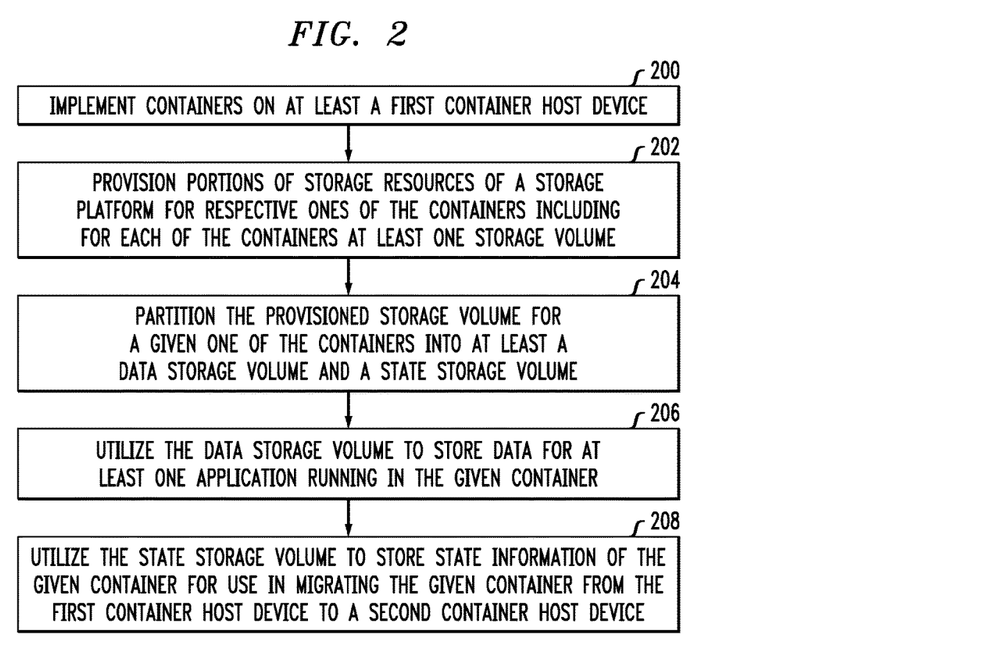
FIG. 2 is a flow diagram of a process for container migration in an illustrative embodiment.

The migration of the given container in step 208 of the FIG. 2 process may be implemented by retrieving the state information of the given container from the state storage volume of the partitioned storage volume, stopping the given container on the first container host device, starting the given container on the second container host device, and utilizing the retrieved state information to configure the given container on the second container host device. Numerous other migration scenarios can be similarly supported.

Figure 3:
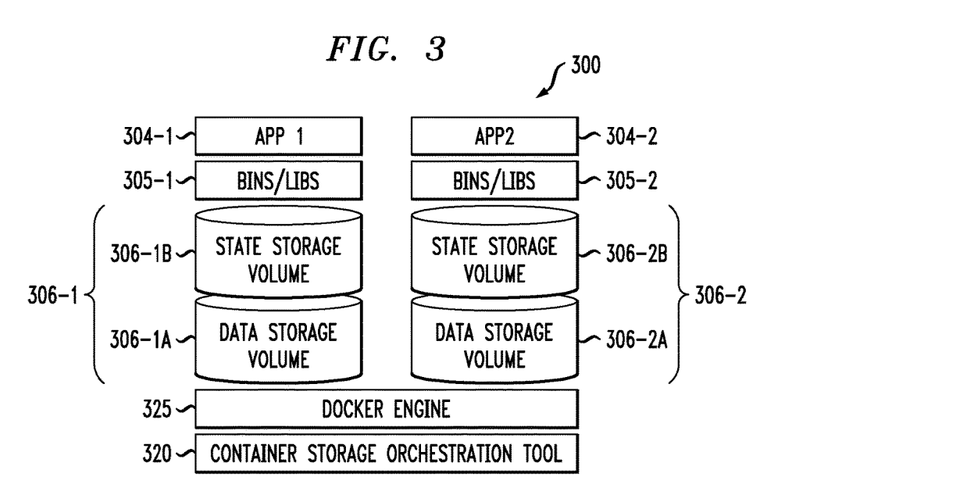
FIG. 3 shows another illustrative embodiment of an information processing system configured to support container migration.

Referring now to FIG. 3, an information processing system 300 is configured to support efficient and flexible container migration in an illustrative embodiment. In this embodiment, system 300 comprises first and second applications 304-1 and 304-2, also denoted as App 1 and App 2, respectively, which are assumed to run in first and second containers. Associated with the first and second applications 304-1 and 304-2 are respective sets of binaries and libraries ("bins/libs") 305-1 and 305-2. The sets of binaries and libraries 305 are utilized in the execution of the corresponding applications 304 and are assumed to be part of the containers in which those applications are executed.

Identifiers of at least portions of the sets of binaries and libraries 305 are assumed to be part of the container environment state information mentioned previously. For example, dependent binaries can be part of the container environment state information. Such container environment state information also includes various container operating environment parameters, including, for example, network parameters, port parameters, storage parameters, command line parameters and identifiers of linked containers. Other environmental variables can additionally or alternatively be part of the container environment state information. This illustratively includes environment variables passed to a given container, as well as other types of container environmental information.

In some embodiments, the container environment state information illustratively comprises all or a substantial part of the information that is returned by a Docker inspect command. Such information includes at least the above-noted network information, storage information and container links.

As an example of a container link that may be part of the container environment state information in a given embodiment, an application running in one container may be configured to link to another container in order to perform a particular function such as authorization or authentication.

The containers comprising respective applications 304-1 and 304-2 and sets of binaries and libraries 305-1 and 305-2 are provisioned with respective storage volumes 306-1 and 306-2. Each such storage volume is partitioned in the manner described elsewhere herein to include a data storage volume and a state storage volume. More particularly, provisioned storage volume 306-1 for a first one of the containers is partitioned into a data storage volume 306-1A and a state storage volume 306-1B. Similarly, provisioned storage volume 306-2 for a second one of the containers is partitioned into a data storage volume 306-2A and a state storage volume 306-2B. The first and second containers are configured utilizing a container storage controller 320 comprising a container storage orchestration tool and having an associated Docker engine 325 which may comprise one or more Docker daemons.

The data storage volume 306-1A or 306-2A stores data utilized by the corresponding application in the course of its execution.

The state storage volume 306-1B or 306-2B stores application state information as well as the above-described container environment state information for the corresponding container. The application state information illustratively comprises an application image that can be used to restart the application after container migration. The container environment state information provides additional state information more particularly relating to the container operating environment for the application. Such container environment state information is not otherwise captured by the application state information.

As indicated previously, migration of containers in conventional Docker implementations can be difficult. This is at least in part due to the fact that such implementations generally do not provide adequate mechanisms for storing container environment state information and utilizing such information in conjunction with container migration. For example, Docker containers generally do not have any special semantics or other constructs for storing container environment state information, and as a result, such information can be lost in conjunction with migration of a given container under conventional practice. This makes container migration inefficient under current practice, leading to possible underutilization of resources in data centers and other information processing systems.

Illustrative embodiments advantageously overcome such difficulties by providing a partitioned storage volume that includes a separate state storage volume such as state storage volume 306-1B or 306-2B to store a wide range of container environment state information in addition to application state information and to facilitate migration of containers based on utilization of such information.

It should again be noted that the particular arrangement of components in the system of FIG. 3, like that of the system 100 of FIG. 1, are presented by way of illustrative example only, and should not be construed as limiting in any way. As noted above, the described functionality can be implemented using additional or alternative components. Accordingly, a wide variety of different container storage controllers, storage volumes and other associated components can be used in other embodiments.

Additional details relating to container creation and migration in illustrative embodiments will now be described with reference to the flow diagrams of FIGS. 4 and 5. These figures detail example container creation and migration techniques providing at least a portion of the functionality of the container storage controller or an associated container migration controller in illustrative embodiments.

Figure 4:
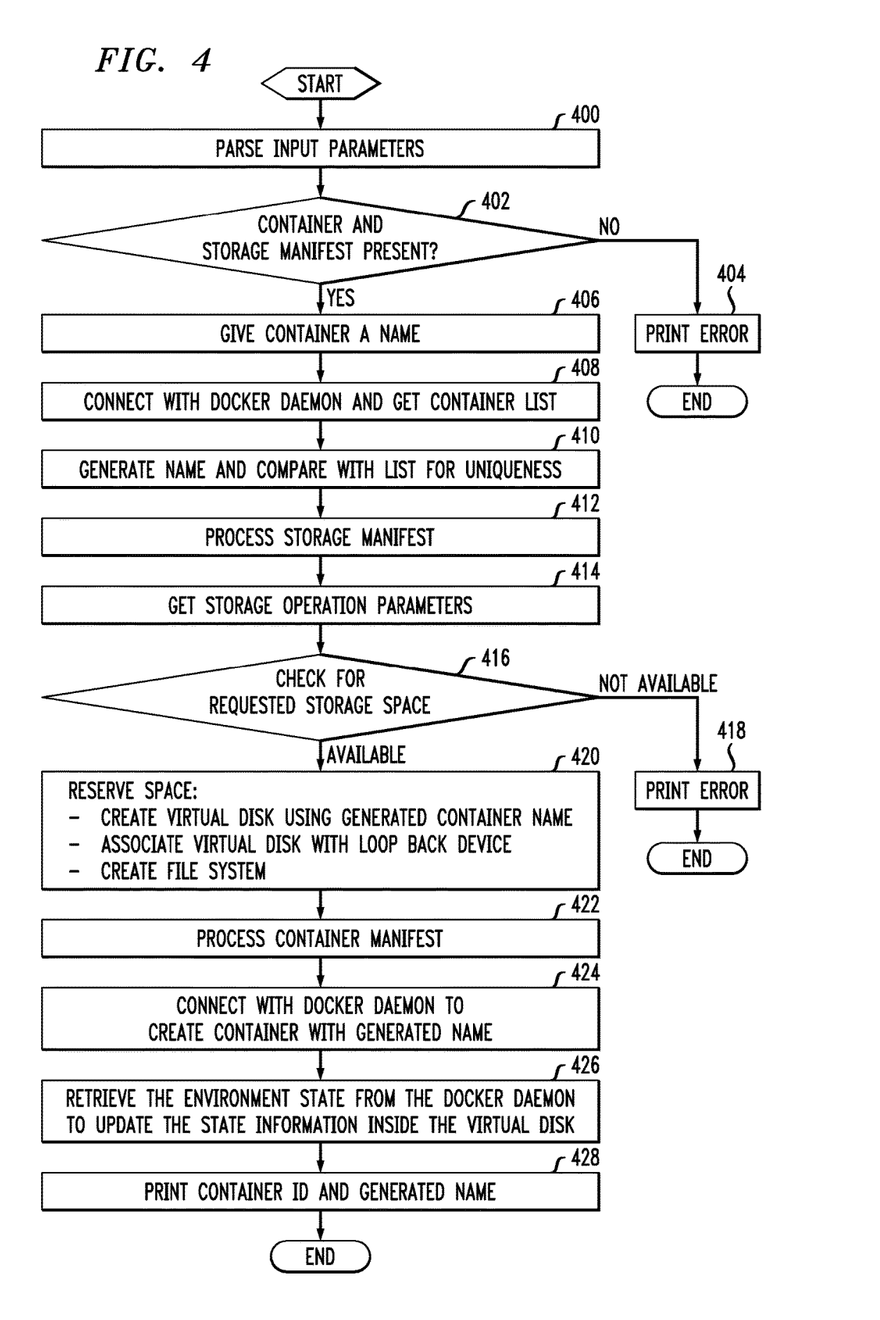
Figure 5:
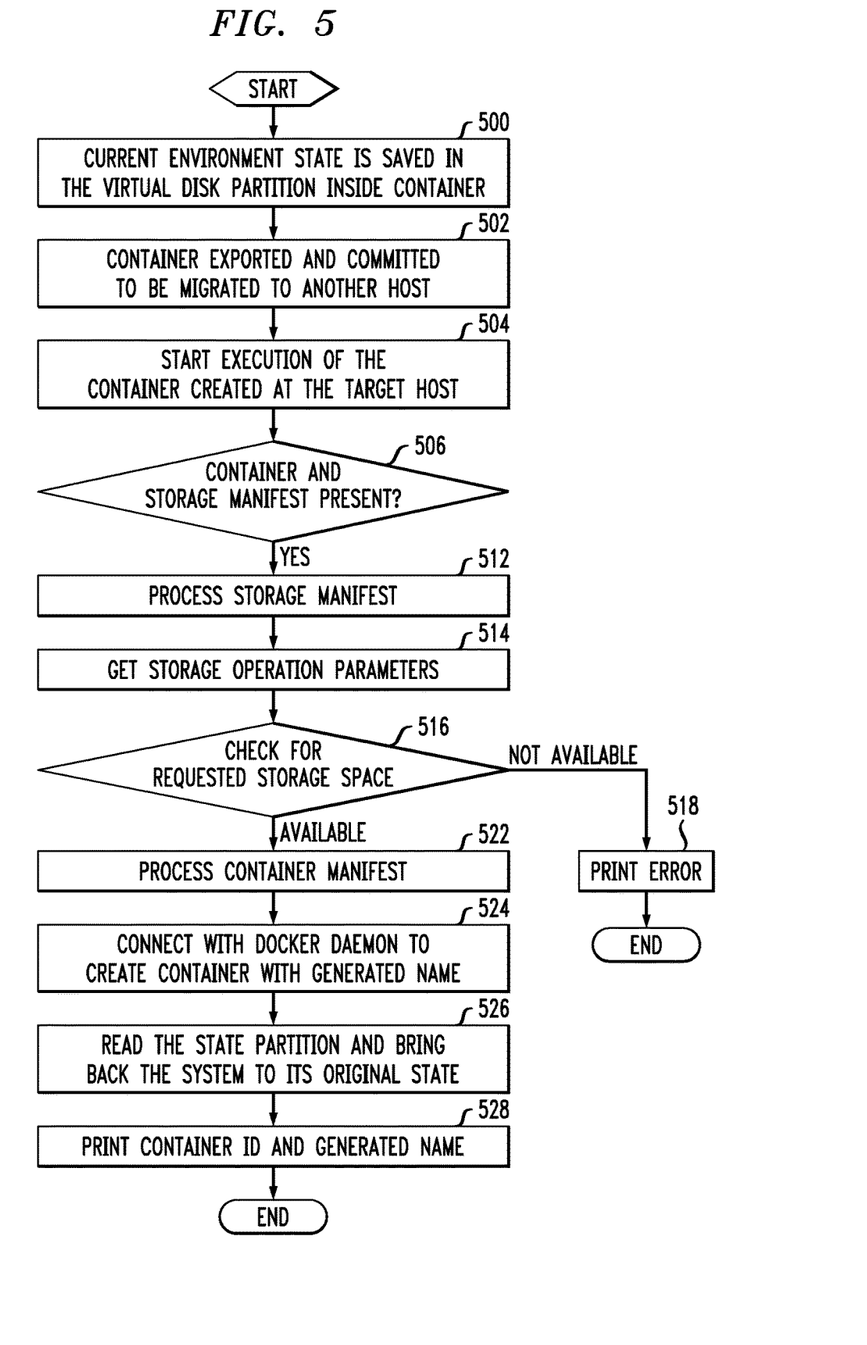

In the illustrative embodiments to be described in conjunction with the flow diagrams of FIGS. 4 and 5, the container storage controller is assumed to comprise a container storage orchestration tool implemented using the above-noted Embers tool, although additional or alternative arrangements can be used in other embodiments. The Embers tool is illustratively written in the Go programming language ("Golang"). The inputs to the Embers tool are assumed to include the container manifest 122 and storage manifest 124 for each container as previously described in conjunction with the FIG. 1 embodiment.

The Embers tool further provides certain selectable processing options, such as an option of "-c" to create a container including a storage volume and associated file system or an option of "-r" to run a container application.

For the create option, the Embers tool creates a storage disk associated with the corresponding container, possibly under a user home directory, with a unique identifiable name. The storage disk is converted into a block device using a loop back device driver, also sometimes referred to as a loop device driver, where the loop back device or loop device is a pseudo-device utilized to make a file system accessible as a block device. A file system is then created for the loop back device, and is mounted inside the target container namespace. Instead of the loop back device driver, any other block device driver which can read the format of the storage disk can be used to create and mount the file system. In the context of the FIG. 1 embodiment, the container is started using the connecting Docker daemon 125 through its RESTful API which may be a publically-available API.

FIGS. 4 and 5 show respective processes for creation of a given container, assumed for purposes of illustration to be one of the containers 102 of the FIG. 1 embodiment, and migration of the given container from one container host device to another container host device. These illustrative processes may be implemented as part of the Embers tool that comprises one possible example of a container storage orchestration tool comprising at least a portion of container storage controller 120 of FIG. 1.

FIG. 4 shows the process for creating one of the containers 102. This process includes steps 400 through 428 as shown. At the start of the process, input parameters including the processing option –c noted above are parsed in step 400, followed by a determination in step 402 as to whether or not container manifest 122 and storage manifest 124 are present. If one or more of these manifests 122 and 124 are not present, the process generates an error indication in step 404 and the process ends. This error indication generation is denoted by a "print error" function in step 404.

If it is determined in step 402 that both the container manifest 122 and the storage manifest 124 are present, the process moves to step 406 to initiate naming of the container being created. This further involves connecting with the Docker daemon 125 in step 408 to get a list of existing containers and then in step 410 generating the container name and comparing it with the list for uniqueness.

After a unique name has been established for the container being created, the processing of the storage manifest 124 is initiated in step 412. This further involves getting the storage operation parameters in step 414 and checking for requested storage space in step 416. If it is determined in step 416 that the requested storage space is not available, the process generates an error indication in step 418 using the print error function and then ends. If it is determined in step 416 that the requested storage space is available, the space is reserved in step 420 by creating a virtual disk using the generated container name, associating the virtual disk with a loop back device and creating a file system for the loop back device.

The virtual disk is assumed to be partitioned in the manner illustrated in FIG. 3, so as to include both a data storage volume and a state storage volume. It should be noted that the use of a virtual disk in this embodiment is only an example, and other types of storage disks can be used in other embodiments, including local disks, external disks or other storage disks, possibly residing on a distributed storage platform.

The processing of the container manifest 122 is then initiated in step 422. This further involves connecting with the Docker daemon 125 to create a container with the generated name in step 424. The container environment state information is retrieved in step 426 from the Docker daemon 125 and used to update the state information stored in the state storage volume partition of the virtual disk. Step 428 outputs the container identifier ("container ID") and generated name via a print function, after which the process ends.

FIG. 5 shows the process for migrating one of the containers 102. This process includes steps 500 through 528 as shown. At the start of the process, the current container environment state information is saved in step 500 in the state storage volume partition of the virtual disk associated with the corresponding container. In step 502, exporting of the container is initiated in conjunction with a commitment to migrate the container to another container host device, also referred to as the "target host."

In step 504, execution of the container created at the target host is started. A determination is then made in step 506 as to whether or not container manifest 122 and storage manifest 124 are present. If one or more of these manifests 122 and 124 are not present, the process may generate an error indication and end in a manner similar to that described in conjunction with FIG. 4, although it is assumed in this embodiment that both manifests are present.

The processing of the storage manifest 124 is initiated in step 512. This further involves getting the storage operation parameters in step 514 and checking for requested storage space in step 516. If it is determined in step 516 that the requested storage space is not available, the process generates an error indication in step 518 using the print error function and then ends. If it is determined in step 516 that the requested storage space is available, the processing of the container manifest 122 is initiated in step 522. This further involves connecting with the Docker daemon 125 to configure the container with the appropriate name in step 524. The corresponding container environment state information is read in step 526 from the state storage volume partition of the virtual disk and utilized to bring the system comprising the migrated container back to its original state prior to the migration. Step 528 outputs the container ID and generated name via a print function, after which the process ends.

The particular processing operations and other system functionality described in conjunction with the flow diagrams of FIGS. 2, 4 and 5 are presented by way of illustrative example only, and should not be construed as limiting the scope of the invention in any way. Alternative embodiments can use other types of processing operations to provide migration functionality for containers using state storage of a partitioned storage volume. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the process steps can be implemented for different containers of respective tenants within a given data center or other information processing system.

Container migration functionality such as that described in conjunction with the flow diagrams of FIGS. 2, 4 and 5 can be implemented at least in part in the form of one or more software programs stored in memory and executed by a processor of a processing device such as a computer or server. For example, the container storage controller 120 and container migration controller 130 are each illustratively implemented as one or more software programs configured to run on underlying hardware of a container host device. As will be described below, a memory or other storage device having executable program code of one or more software programs embodied therein is an example of what is more generally referred to herein as a "processor-readable storage medium."

The illustrative embodiments described above provide significant advantages over conventional arrangements.

For example, as some embodiments of the invention address migration difficulties of conventional Docker implementations, these embodiments make Docker containers more suitable for use in processing environments such as data centers in which efficient and flexible migration of containers is desirable in order to facilitate optimal utilization of available data center resources. However, the disclosed arrangements are also applicable to other types of LXCs or containers generally.

Some embodiments provide a separate state storage volume for a given container so as to permit container environment state information to be saved in association with application state information. Such an arrangement provides a high degree of coupling of application state information with container environment state information, ensuring that the corresponding container, if preempted, moved or otherwise migrated within a data center or other information processing system, can be accurately and easily returned to its previous operating state in conjunction with the migration.

Illustrative embodiments are advantageously configured to facilitate migration of containers in data centers in which it is important to optimize resource utilization in order to meet service level agreements. For example, these embodiments allow containers to be migrated across racks or other types of infrastructure within a given data center, thereby providing enhanced efficiency and flexibility in container deployments.

Embodiments of the invention are not limited to use with virtual storage volumes but are more generally applicable to any external storage volume or other storage volume that can be provisioned to a container. This includes local storage volumes or other types of storage resources associated with one or more container host devices.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative multi-tenant environments can be provided comprising multiple containers utilizing respective provisioned portions of underlying storage resources of a storage platform.

Also, the particular processing operations and other system functionality described in conjunction with the flow diagrams of FIGS. 2, 4 and 5 are presented by way of illustrative example only, and should not be construed as limiting the scope of the invention in any way. Alternative embodiments can use other types of processing operations involving other information processing system components.

In some embodiments, container storage volume provisioning and container migration functionality is implemented at least in part utilizing a container storage orchestration tool, although other embodiments need not utilize such tools.

It is to be appreciated that storage volume partitioning and associated storage migration functionality such as that described in conjunction with the diagrams of FIGS. 1 through 5 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, processing environments, containers, storage resources, container storage controllers and container migration controllers that can benefit from utilization of a state storage volume partition to facilitate migration of containers. Also, the particular configurations of system and device elements shown in FIGS. 1 and 3 and the processing operations in FIGS. 2, 4 and 5 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least a first container host device implementing a plurality of containers;
a storage platform coupled to the first container host device and implementing storage resources for utilization by the containers; and
a container storage controller associated with the first container host device;
wherein the container storage controller is configured to provision portions of the storage resources for respective ones of the containers including for each of the containers at least one storage volume;
wherein the provisioned storage volume for a given one of the containers is partitioned into at least a data storage volume and a state storage volume;
the data storage volume being configured to store data for at least one application running in the given container; and
the state storage volume storing state information of the given container for use in migrating the given container from the first container host device to a second container host device; and
wherein the state information comprises application state information for a given application running in the given container and corresponding container environment state information for the given application.

2. The apparatus of claim 1 wherein the first container host device comprises at least one processor coupled to a memory and wherein at least a portion of the container storage controller is implemented by the processor executing software stored in the memory.

3. The apparatus of claim 1 wherein the storage platform comprises at least one of a storage fabric and a storage array.

4. The apparatus of claim 1 wherein the provisioned storage volumes comprise respective storage disks having respective associated file systems.

5. The apparatus of claim 1 wherein the container environment state information for the given application running in the given container comprises information characterizing one or more parameters of a container operating environment of the given application including one or more of network parameters, port parameters, storage parameters and command line parameters.

6. The apparatus of claim 1 wherein the container environment state information for the given application running in the given container comprises identifiers of one or more other containers that the given application links to in the course of its execution.

7. The apparatus of claim 1 further comprising a container migration controller configured to retrieve the state information of the given container from the state storage volume of the partitioned storage volume, to stop the given container on the first container host device, to start the given container on the second container host device, and to utilize the retrieved state information to configure the given container on the second container host device.

8. The apparatus of claim 7 wherein the container migration controller is implemented at least in part within the container storage controller.

9. The apparatus of claim 1 wherein the container storage controller comprises a container storage orchestration tool running as an application on the first container host device.

10. The apparatus of claim 1 wherein the container storage controller is configured to receive as inputs for each of the containers a container manifest for that container and a storage manifest for that container.

11. The apparatus of claim 10 wherein the container storage controller is configured to identify the given container characterized by the container manifest and provision the storage volume and an associated file system for the given container in accordance with the storage manifest prior to starting the given container.

12. The apparatus of claim 11 wherein the storage manifest for the given container specifies one or more of storage volume size, storage type, deduplication property, protection mechanism and storage mount path for the storage volume of that container.

13. An information processing system comprising the apparatus of claim 1.

14. The apparatus of claim 1 wherein the data storage volume stores data utilized by the given application in the course of its execution, the application state information comprises an application image that can be used to restart the given application after migration of the given container from the first container host device to the second container host device, and the container environment state information comprises state information relating to a container operating environment for the given application.

15. A method comprising:
implementing containers on at least a first container host device;
configuring storage resources of a storage platform for utilization by the containers;
provisioning portions of the storage resources for respective ones of the containers including for each of the containers at least one storage volume; and
partitioning the provisioned storage volume for a given one of the containers into at least a data storage volume and a state storage volume;
the data storage volume being configured to store data for at least one application running in the given container; and
the state storage volume storing state information of the given container for use in migrating the given container from the first container host device to a second container host device;
wherein the state information comprises application state information for a given application running in the given container and corresponding container environment state information for the given application; and
wherein the implementing, configuring, provisioning and partitioning are performed by at least one processing device comprising a processor coupled to a memory.

16. The method of claim 15 further comprising:
retrieving the state information of the given container from the state storage volume of the partitioned storage volume;
stopping the given container on the first container host device;
starting the given container on the second container host device; and
utilizing the retrieved state information to configure the given container on the second container host device.

17. The method of claim 15 wherein the data storage volume stores data utilized by the given application in the course of its execution, the application state information comprises an application image that can be used to restart the given application after migration of the given container from the first container host device to the second container host device, and the container environment state information comprises state information relating to a container operating environment for the given application.

18. A computer program product comprising a non-transitory processor-readable storage medium having stored therein program code of one or more software programs, wherein the program code when executed by at least one processing device causes the processing device:

to implement containers on at least a first container host device;

to configure storage resources of a storage platform for utilization by the containers;

to provision portions of the storage resources for respective ones of the containers including for each of the containers at least one storage volume; and to partition the provisioned storage volume for a given one of the containers into at least a data storage volume and a state storage volume;

the data storage volume being configured to store data for at least one application running in the given container; and the state storage volume storing state information of the given container for use in migrating the given container from the first container host device to a second container host device;

wherein the state information comprises application state information for a given application running in the given container and corresponding container environment state information for the given application.

19. The computer program product of claim 18 wherein the program code when executed by said at least one processing device further causes the processing device:

to retrieve the state information of the given container from the state storage volume of the partitioned storage volume;

to stop the given container on the first container host device;

to start the given container on the second container host device; and to utilize the retrieved state information to configure the given container on the second container host device.

20. The computer program product of claim 18 wherein the data storage volume stores data utilized by the given application in the course of its execution, the application state information comprises an application image that can be used to restart the given application after migration of the given container from the first container host device to the second container host device, and the container environment state information comprises state information relating to a container operating environment for the given application.

* * * * *